July 13, 1948. W. J. GRACE 2,445,304
VISUAL VIBRATING REED STROBOSCOPE
Filed Jan. 5, 1945 2 Sheets-Sheet 1

INVENTOR
WILLIAM J. GRACE
BY
ATTORNEY

July 13, 1948. W. J. GRACE 2,445,304
VISUAL VIBRATING REED STROBOSCOPE
Filed Jan. 5, 1945 2 Sheets-Sheet 2

INVENTOR
WILLIAM J. GRACE
BY
ATTORNEY

Patented July 13, 1948

2,445,304

UNITED STATES PATENT OFFICE 2,445,304

VISUAL VIBRATING REED STROBOSCOPE

William J. Grace, Silver Spring, Md., assignor to the United States of America as represented by the Secretary of the Navy Application January 5, 1945, Serial No. 571,431

1 Claim. (Cl. 88—14)

The present invention relates generally to speed indicating devices and more particularly to an improved arrangement of the stroboscopic type for indicating the frequency of rotation of an object.

In accordance with the prior art such indicating devices utilize the phenomenon of persistence of vision to create an illusory stationary view of a reference point or bench mark on a rotating object by cyclically affording a view of the reference point or mark during each rotation. The point appears to be motionless when the recurrence rate of the successive instantaneous views is equal to the frequency of rotation. A change in the relative values of the last-mentioned parameters is effective to create an illusion of "slow motion." Such indicating devices are usually of the neon tube type and are generally calibrated in revolutions per minute. They are of particular utility in applications in which the rotating object, the speed of which is to be determined, is inaccessible, so that connection or contact with a rotating shaft attached thereto cannot readily be made, or in applications in which the additional torque required to drive a speed measuring device would adversely affect the operation of the machine under test or the accuracy of the measurement.

In such applications as the testing and maintenance of antiaircraft artillery fire control apparatus the speeds of rotation of gyroscopes and other mechanisms having rotating shafts must be determined. In these applications, however, it is difficult to employ prior-art speed indicating devices of the general class under consideration, since the rotating elements and gyroscopes are often located in dark and relatively inaccessible places not easily reached and lighted by devices of the neon tube type.

It is an object of the present invention, therefore, to provide a new and improved indicating device adapted for ready and facile determination of the speed of rotation of a mechanism which cannot readily be viewed with conventional devices and which cannot accept the additional torque imposed by a conventional direct connected speed indicating device.

It is also an object of the invention to provide an improved arrangement for viewing vibrating, rotating, or reciprocating mechanisms accurately over a relatively wide range of frequencies.

Still another object of the invention is to provide an indicating device which may be readily and easily adjusted and calibrated.

A further object of the invention is to provide such an arrangement which involves relatively simple components and may easily be manufactured.

For a better and further understanding of the present invention together with other and further objects thereof reference is made to the following specification together with the accompanying drawings in which.

Figure 1:
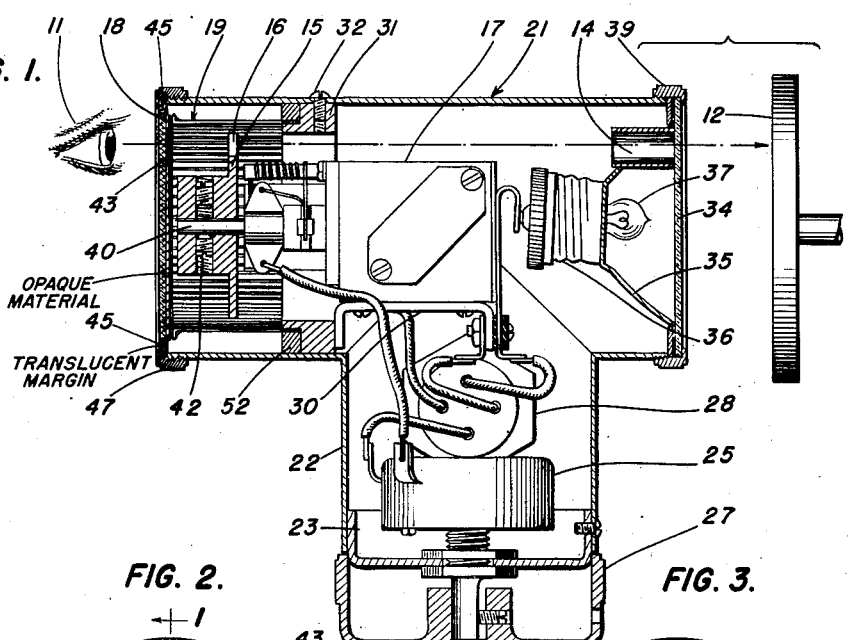
Fig. 1 is a longitudinal sectional view, partly in elevation, taken along line 1—1 of Fig. 2, looking in the direction of the arrows, and showing a preferred embodiment of the invention.

Referring to Fig. 1 there is illustrated a speed indicating device in accordance with the present invention for indicating to an observer at 11 the frequency of rotation of an object 12 having some reference point thereon. This indicating device comprises: means including a sighting tube 14 and a rotating disc 15 having a single slotted opening 16 therethrough for cyclically viewing the reference point by periodically opening a sighting path thereto; motor means 17 for rotating the element in synchronism with the object, so that the first-mentioned means affords an illusory stationary view of the point; and means including an indicating dial 18 and a reed assembly disclosed generally at 19 for furnishing a visual indication of the speed of rotation of object 12. The whole assembly is mounted in a casing 21. The casing is provided with a cylindrical lower extension 22 which terminates at its lower end in an end plate 23. The end plate provides a mounting for a motor speed-control rheostat 25 which has a shaft extending downwardly to a speed control knob 27. The terminals of the rheostat are connected to motor 17 and to a socket 28 adapted to receive a terminal plug from the current supply source (not shown). The motor is supported by a bracket 30 which is in turn secured to a mounting ring 31. The mounting ring is held in place by screws 32 and is a part of the reed assembly, the construction and operation of which will be described hereinafter.

In order to illuminate rotating member 12, a lighting means mounted near the forward end of the casing and behind a transparent end plate 34 is provided. The lighting means comprises a silvered parabolic reflector 35, having a socket 36 mounted axially thereon. Secured in the socket is an electric lamp 37. The socket is also electrically coupled to the input current supply source through terminal socket 28 in any conventional manner.

The sighting tube 14 may be made integral with reflector 35. The pane and reflector assembly are rigidly secured in place by a clamping ring 39, screwed on the threaded forward portion of the casing.

Figure 3:
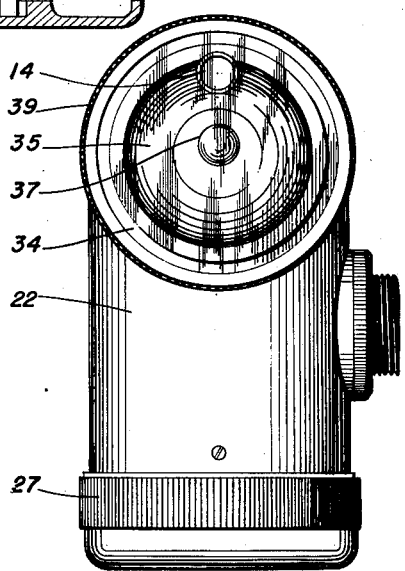
Fig. 3 is a front view thereof.
Figure 4:
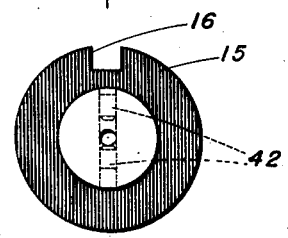
Fig. 4 is a detail view of the "chopper" wheel included in the device.
Figure 5:
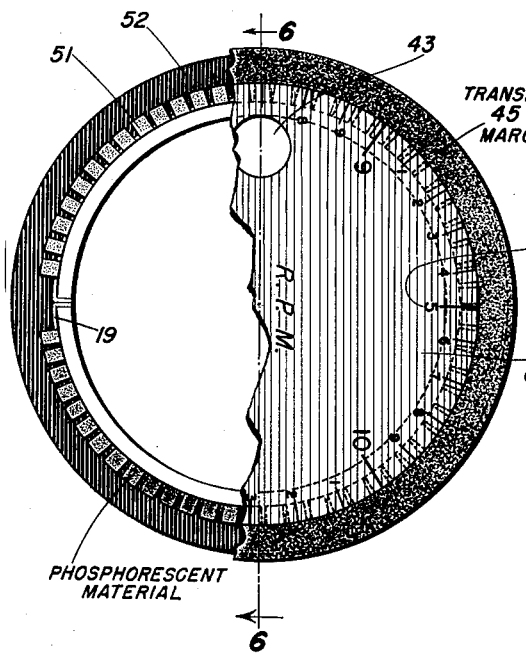
Fig. 5 is a plan of the indicating dial, with a portion broken away showing its relationship to the reed assembly.
Figure 6:
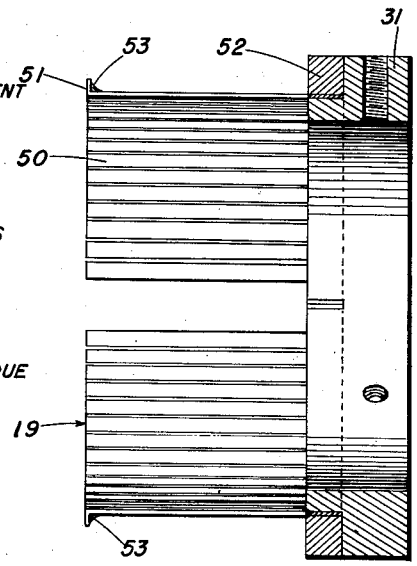
Fig. 6 is an axial sectional view of the reed assembly.
Figures 7, 8:
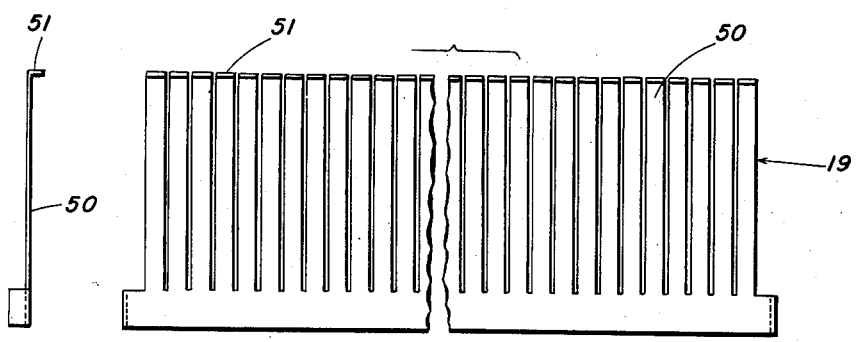
Fig. 7 is a side elevational view of the reed assembly developed in one plane and centrally broken away.
Fig. 8 is a corresponding end elevation of the reed assembly.

A shaft 40 of the motor extends rearwardly within the casing and terminates at its rear end in close spaced relation to the fixed dial 18. The dial is provided with an aperture 43 aligned with sighting tube 14 (Fig. 3). Fixed upon shaft 40 is a "chopper" wheel or disk 15. The wheel includes a hub which accommodates a plurality of radially adjustable screws 42. The slot 16 in the "chopper" wheel tends to unbalance it, and the amount of such unbalance necessary to provide proper amplitude of vibration of the reeds of assembly 19 is obtainable by radial adjustment of screws 42. The "chopper" wheel (Fig. 4) is located within the area bounded by the reeds.

Figure 2:
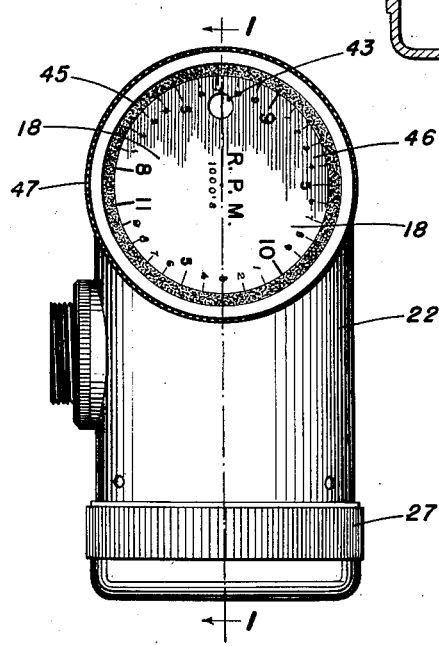
Fig. 2 is a rear elevation of the device.

Dial 18 is formed of glass, transparent plastic such as Lucite, or other transparent material. As best seen in Fig. 2, the dial is largely covered with opaque material comprising concealing means for obstructing the view of non-vibrating reeds, but is formed with a translucent outer margin 45, the inner radius of this margin being equal to the outer radius of the circle defined by the reeds. The rim of the opaque coating is marked to define a scale 46, preferably graduated in revolutions per minute. The aperture 43 is formed in the opaque coating and located to aline with the sighting tube 14 and, cyclically, with the aperture 16 in wheel 15. Dial 18 is held in place by a clamping ring 47.

The reeds are in the form of a cylindrical comb 19 excited by rotation of the "chopper" wheel and individually designed to resonate at a distinguishable predetermined frequency, whereby the resonance of one of the said means affords an indication of the rotation frequency of the disc 15. Each of the spaced reeds 50 is formed with an outwardly turned lip 51. The outer faces of the lips, proximate to dial 18, are coated with phosphorescent or other self-luminous material. The reeds are held in place by a clamping ring 52 and each reed may be provided with a small slug of appropriate material 53 for purposes of tuning. The reeds may be so adjusted as to cover a desired range of revolutions per minute, say, from 8000 to 11,000 R. P. M. at 50 R. P. M. increments.

When it is desired to ascertain the rotation frequency of an object such as the wheel 12, having a distinguishable mark thereon, motor 17 is started. Lamp 37 continuously illuminates object 12. The sighting path from the observer through aperture 43 is obstructed for the major portion of the cycle of rotation of the wheel and is opened through slot 16 and sighting tube 14 to object 12 for a brief interval during each rotation of the disc 15. The speed of the motor is adjusted by setting the rheostat until the mark on the wheel appears to an operator sighting along the line indicated to stand still. When this condition exists, disc 15 is synchronized with the wheel 12, and the operator observes the reed which is individually adapted to resonate at the appropriate rotation frequency of the disc and observes on the dial 18 at an index point adjacent to the vibrating reed the speed at which disc 15 and accordingly wheel 12 are rotating.

While there has been shown what is considered to be the preferred embodiment of the invention, it will be evident to those skilled in the art that various modifications and changes may be made therein without departing from the spirit of the invention or the scope of the claim appended hereto.

I claim:

A stroboscopic device for indicating the frequency of rotation of an object that has a visible reference mark thereon, said device comprising a casing, means including a dynamically unbalanced rotating element in mechanical contact with the remaining components of the device, whereby mechanical impulses having a frequency corresponding to the frequency of rotation of said element are imparted to the device, a sighting tube carried by said casing, an apertured dial having a translucent indicia portion and mounted in said casing, with the aperture in line with the sighting tube, and a plurality of reeds mounted in the casing in operating alinement with the indicia on the dial, said rotating element having a single opening therethrough and being mounted in the casing with its said opening positioned for periodic alinement with the aperture in the dial, for cyclically opening a sighting path through said sighting tube, said opening, and said aperture, to said reference mark, and means for rotating said element at a frequency having a functional relationship to the rotation frequency of said object, whereby the reeds will be excited into vibration directly by the mechanical impulses produced by the rotation of said object and will indicate by resonance the corresponding frequency and thus afford an indication of the rotation frequency of the said object.

WILLIAM J. GRACE.

REFERENCES CITED

The following references are of record in the file of this patent:

UNITED STATES PATENTS

| Number | Name | Date |
|---|---|---|
| 817,555 | Hartmann-Kempf | Apr. 10, 1906 |
| 975,949 | Henwood | Nov. 15, 1910 |
| 1,208,488 | Pontois | June 4, 1912 |
| 1,215,135 | Fisher | Feb. 6, 1917 |
| 1,416,550 | Frank | May 16, 1922 |
| 1,566,124 | Rogers | Dec. 15, 1925 |
| 1,807,149 | Butler et al. | May 26, 1931 |
| 2,303,234 | Schwarzkopf et al. | Nov. 24, 1942 |